United States Patent
Sugita et al.

(10) Patent No.: US 7,598,309 B2
(45) Date of Patent: Oct. 6, 2009

(54) POLYPROPYLENE-BASED RESIN COMPOSITION AND MOLDED PRODUCT THEREOF

(75) Inventors: Yasuhisa Sugita, Ichihara (JP); Masato Koike, Susono (JP); Susumu Hara, Susono (JP); Atsushi Sugiyama, Susono (JP)

(73) Assignees: Idemitsu Kosan Co. Ltd, Tokyo (JP); Yazaki Corporation, Tokyo (JP)

( * ) Notice: Subject to any disclaimer, the term of this patent is extended or adjusted under 35 U.S.C. 154(b) by 602 days.

(21) Appl. No.: 11/364,556

(22) Filed: Mar. 1, 2006

(65) Prior Publication Data

US 2006/0199891 A1    Sep. 7, 2006

(30) Foreign Application Priority Data

Mar. 2, 2005    (JP) .............................. 2005-056926

(51) Int. Cl.
*C08J 3/22*    (2006.01)
(52) U.S. Cl. ........................... 524/451; 525/240
(58) Field of Classification Search ............... 524/451; 525/240
See application file for complete search history.

(56) References Cited

U.S. PATENT DOCUMENTS 5,985,973 A * 11/1999 Sumitomo et al. .......... 524/451
2003/0083437 A1 * 5/2003 Bugada et al. .............. 525/240
2005/0171263 A1 * 8/2005 Kanamori et al. .......... 524/430

OTHER PUBLICATIONS

Thermoplastic Olefin Elastomer Composition; 2002-128975 May 9, 2002; Ishikawa Masanao; pp. 1-5; Abstract.
Olefin-Based Thermoplastic Elastomer Composition; 2002-128975 May 9, 2002; Ishikawa Masano et al.; pp. 1-5; Abstract.

* cited by examiner

*Primary Examiner*—Ling-Siu Choi
*Assistant Examiner*—Hui Chin
(74) *Attorney, Agent, or Firm*—Millen, White, Zelano & Branigan, P.C.

(57) ABSTRACT

A polypropylene-based resin composition including (A) 70 to 96 mass % of a polypropylene-based soft resin having an ISO D hardness of 35 or less and containing 25 to 55 mass % of xylene-insoluble part at room temperature and 75 to 45 mass % of xylene-soluble part at room temperature, (B) 2 to 10 mass % of homopolypropylene having a melt mass flow rate (MFR) at 230° C. under a load of 2.16 kg measured in accordance with JIS K 7210 of 1 to 30 g/10 min. and stereoregularity (meso pentad fraction) of 90% or more, (C) 2 to 20 mass % of a propylene-ethylene random copolymer having an ethylene content of 1 to 10 mass %, and (D) 0 to 15 mass % of a platy inorganic filler.

19 Claims, 1 Drawing Sheet

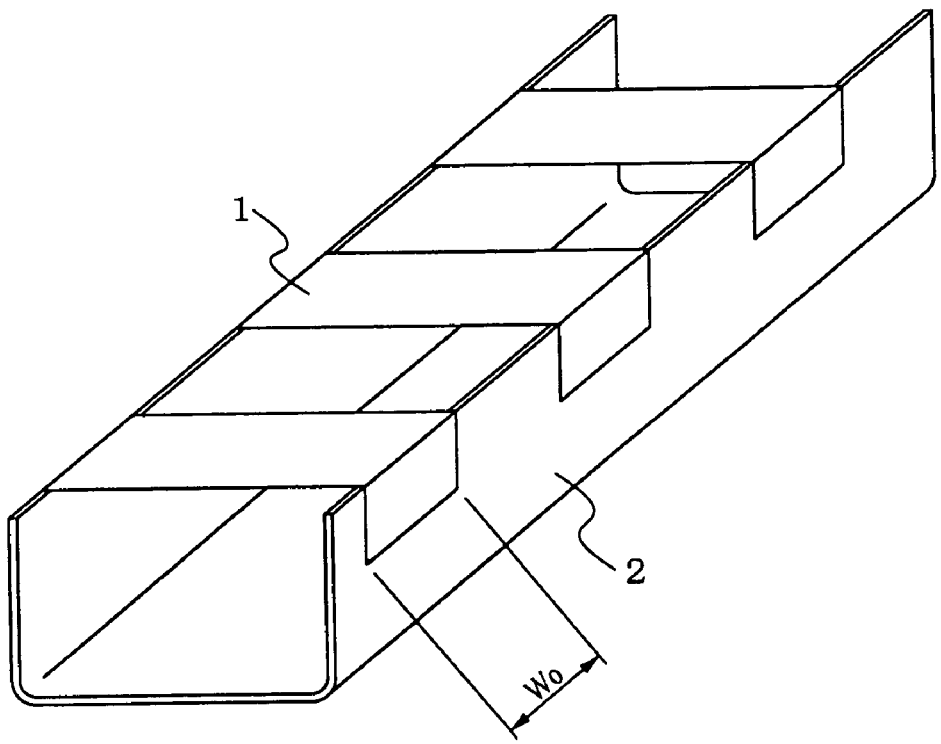
(a)
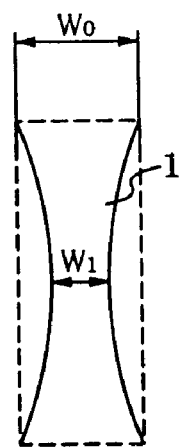
(b)

POLYPROPYLENE-BASED RESIN COMPOSITION AND MOLDED PRODUCT THEREOF

BACKGROUND OF THE INVENTION

1. Field of the Invention

The invention relates to a polypropylene-based resin composition and a molded product thereof.

2. Background Art

Due to increasing awareness of global environmental issues in recent years, generation of hydrogen chloride gas during combustion of poly(vinyl chloride) materials (hereinafter referred to as "PVC materials") is acknowledged as a problem. Development and use of materials giving due consideration to the global environmental is strongly desired.

In view of this situation, replacing known PVC materials with olefin-based materials as an environment-conscious material is being investigated.

As known olefin-based materials that can be substituted for the PVC materials, ethylene-based resins such as EEA (ethylene-ethyl acrylate copolymer) and EVA (ethylene-vinyl acetate copolymer) are used as basic materials.

These materials, however, have a problem of insufficient heat resistance, because a major component is a polyethylene resin. In the tape application, for example, a high drying temperature cannot be used after application of an adhesive to a film after forming, leading to a poor productivity. In addition, when the tape is used as an adhesive tape for vehicle mounting, the tape may be peeled away or frizzled due to insufficient heat resistance. Thus, insufficient heat resistance has been a problem.

If a known ethylene-based material is simply replaced with polypropylene(PP)-based material excelling in heat resistance, for example, in order to solve this problem, not only superior characteristics as an adhesive film possessed by known PVC materials such as texture and hand-cutting properties are impaired, but also calendar molding frequently used in the PVC material forming processes may not be applied with difficulty (see Japanese Patent Applications Laid-open No. 2002-128975 and No. 2002-167476).

The invention has been completed in view of the above-described situation and has an object of providing a polypropylene-based resin composition excelling in calendar moldability and capable of producing a molded product exhibiting excellent heat resistance and having good texture and hand-cutting properties, and a molded product made from the composition.

As a result of extensive studies to achieve this object, the inventors has found a combined use of a polypropylene-based soft resin, a homopolypropylene, and a propylene-ethylene random copolymer having specific properties and specific structures as resin components. This finding has led to the completion of the invention.

SUMMARY OF THE INVENTION

According to the invention, the following polypropylene-based resin compositions and the like are provided.

1. A polypropylene-based resin composition comprising the following components (A) to (D):

(A) 70 to 96 mass % of a polypropylene-based soft resin having an ISO D hardness of 35 or less and containing 25 to 55 mass % of xylene-insoluble part at room temperature and 75 to 45 mass % of xylene-soluble part at room temperature, (B) 2 to 10 mass % of homopolypropylene having a melt mass flow rate (MFR) at 230° C. under a load of 2.16 kg measured in accordance with JIS K 7210 of 1 to 30 g/10 min. and stereoregularity (meso pentad fraction) of 90% or more, (C) 2 to 20 mass % of a propylene-ethylene random copolymer having an ethylene content of 1 to 10 mass %, and (D) 0 to 15 mass % of a platy inorganic filler.

2. The polypropylene-based resin composition according to 1, which comprises 31 to 44 mass % of components soluble at 0° C., 43 to 55 mass % of components fractionated at temperatures of more than 0° C. and not more than 100° C., and 13 to 16 mass % of components fractionated at temperatures of more than 100° C., when fractionated by temperature rising elution fractionation (TREF), wherein TREF comprises adding o-dichlorobenzene to the polypropylene-based resin composition, heating the mixture to dissolve the resin components, filtering the mixture, adding a filler to the filtrate, cooling the mixture from 135° C. to 0° C. at a rate of 5° C./hr to crystallize the resin, maintaining the mixture at 0° C. for 30 min., and heating the mixture at a rate of 40° C./hr.

3. The polypropylene-based resin composition according to 1 or 2, comprising the component (D) in an amount of 1 to 15 mass %.

4. The polypropylene-based resin composition according to any of 1 to 3, wherein the polypropylene-based soft resin of the component (A) is produced by polymerizing in one reactor or produced in two or more reactors connected in series or parallel, followed by powder-blending.

5. The polypropylene-based resin composition according to any of 1 to 4, wherein the platy inorganic filler of the component (D) is talc.

6. The polypropylene-based resin composition according to any of 1 to 5, further comprising 0.05 to 0.5 part by weight of (a) phenolic antioxidant(s) and 0.05 to 0.5 part by weight of (a) sulfur-containing antioxidant(s) for 100 parts by weight of the total amount of the components (A) to (D).

7. A molded product made from the polypropylene-based resin composition according to any of 1 to 6 by a calendar molding method.

8. The molded product according to 7, wherein the product is a tape.

9. The molded product according to 8, wherein the tape has an aqueous emulsion-type acrylic adhesive coated thereon.

10. The molded product according to 8 or 9, wherein the product is a tape for vehicle wire harnesses.

According to the invention, a polypropylene-based resin composition excelling in calendar moldability and capable of producing a molded product exhibiting excellent heat resistance and having good texture and hand-cutting properties, and the molded product is provided. The composition of the invention is an environmentally-friendly composition using non-PVC-based resin components. In the composition of the invention, heat resistance is ensured by using a polypropylene-based soft resin instead of known ethylene-based resins such as EEA or EVA as a base resin.

The term "hand cutting properties" used herein means ease of cutting a tape when a reeled tape product is cut and the conditions of cut cross-section. The term is used as an index of processability (usability) when an object is processed using the tape material. Hand cutting properties require adequate extendibility and strength, and are closely related to elongation characteristics. If the extendibility is insufficient, the tape is cut while being reeled. On the other hand, when the tape has only poor strength, but is sufficiently extendible, the tape cutting within an arm's reach of a workman may be difficult, resulting in a decrease in the processing efficiency, fibrillated cut sections, and peeling of tape in the fibrillated sections.

Another important factor relating to the usability is texture (a fitted feeling) during reeling-in of the tape material. The texture is closely related to a stress-distortion line. A tape material with an excellent texture can be smoothly reeled in without producing slacks and wrinkles, and can be beautifully finished.

BRIEF DESCRIPTION OF THE DRAWINGS

FIG. 1 is a drawing showing the test method for instant heat resistance of tape.

DETAILED DESCRIPTION OF THE INVENTION AND PREFERRED EMBODIMENT

The polypropylene-based resin composition of the invention comprises the following components (A) to (C) or (A) to (D):

(A) 70 to 96 mass % of a polypropylene-based soft resin having an ISO D hardness of 35 or less and containing 25 to 55 mass % of xylene-insoluble part at room temperature and 75 to 45 mass % of xylene-soluble part at room temperature, (B) 2 to 10 mass % of homopolypropylene having a melt mass flow rate (MFR) at a temperature of 230° C. and a load of 2.16 kg measured in accordance with JIS K 7210 of 1 to 30 g/10 min. and stereoregularity (meso pentad fraction) of 90% or more, (C) 2 to 20 mass % of a propylene-ethylene random copolymer having an ethylene content of 1 to 10 mass %, and (D) 0 to 15 mass % of a platy inorganic filler.

The soft resin (A) is a resin excelling in flexibility and having ISO D hardness (hereinafter referred to as "HDD") of 35 or less, preferably 15 to 35, and more preferably 20 to 35.

A soft resin having an HDD of less than 15 only contains a very small amount of high temperature crystal components and may be insufficient in heat resistance. Such a resin may produce problems such as adhesion of molten resin to a roll or the like in the plasticizing process and the like during a calendar molding. If the HDD exceeds 35, flexibility is insufficient and the texture of the product is impaired. In the invention, addition of an elastomer (rubber) to the composition to make up the impaired texture is not preferable, because such an additive may lead to degradation of instant heat resistance and cost increase.

The soft resin (A) contains 25 to 55 mass %, preferably 25 to 50 mass % of xylene-insoluble part at room temperature (25° C.), which contains crystalline components as major components, and 75 to 45 mass %, preferably 75 to 50 mass % of xylene-soluble part at room temperature (25° C.), which contains non-crystalline components as major components.

A resin which contains insoluble part in an amount of less than 25 mass % contains only a very small amount of high temperature crystal components and has insufficient heat resistance. Such a resin may produce problems such as adhesion of molten resin to a roll or the like in the plasticizing process and the like during a calendar molding. If the amount of the insoluble part is more than 55 mass %, flexibility is insufficient and the texture of the product is impaired. The addition of an elastomer (rubber) to the composition to make up the impaired texture is not desirable for the above-mentioned reasons.

The soft resin (A) has a melt mass flow rate (hereinafter referred to as "MFR"), measured in accordance with JIS K 7210 at 230° C. with a load of 2.16 kg, of preferably from 0.1 to 20 g/10 min., and more preferably from 0.4 to 10 g/10 min.

If the MFR is less than 0.1 g/10 min., the load on an extruder may increase when this component is melted and kneaded together with the later-described components (B) and (C), or components (B), (C), and (D), because the soft resin (A) is the main component and possesses a high viscosity. As a consequence, kneading may become difficult and productivity may be decreased. Moreover, the mixture may generate a significant amount of exothermic heat, which may lead to deterioration of the resin. The deterioration of the resin not only greatly impairs mechanical characteristics of the product, but also leads to problems such as an impaired external appearance and a sticky surface due to decomposed matter. If low shearing kneading is adopted by reducing the kneading power in order to control heat generation, the mixture cannot be homogeneously mixed. When the component (D) is used, dispersion of the component (D) may be difficult, giving rise to possible impaired external appearance and mechanical characteristics.

If the MFR is more than 20 g/10 min., on the other hand, the characteristics such as tension breaking strength and the like of the soft resin (A) itself may be reduced, which impairs mechanical characteristics such as strength in the case of breaking of the product and the like.

When a product with a greater strength, such as strength in the case of breaking, is strongly desired, the soft resin with a smaller MFR is preferable. Specifically, an MFR of 5 g/10 min. or less is preferable, with a more preferable MFR being from 0.4 to 5.0 g/10 min.

In regard to the relationship between the MFR of the soft resin (A) and other resin components (components (B) and (C)), if the difference of the MFR among the components increases, homogeneous blending of the resins may be difficult, giving rise to the possibility of unduly impairing the external appearance and mechanical characteristics of the product. Therefore, the ratio of MFR between two resin components among the components (A), (B), and (C) is preferably in a range of 0.1 to 10.0.

The amount of the soft resin (A) in the resin composition of the invention is from 70 to 96 mass %, preferably from 70 to 90 mass %, and still more preferably from 70 to 85 mass %. If the amount is less than 70 mass %, flexibility is insufficient and the texture of the product is impaired. The addition of an elastomer (rubber) to the composition to make up the impaired texture is not desirable as mentioned above. If the amount of the soft resin (A) exceeds 96 mass %, on the other hand, problems such as adhesion to the roller during calendar molding and a decrease in instant heat resistance of the product occur.

The soft resin (A) can be prepared using methods described in Japanese Patent Application Laid-open No. 3-62805 (Patent No. 3016816), Japanese Patent Application Laid-open No. 2003-268060, and the like.

The polypropylene-based soft resin (A) in the resin composition of the invention is preferably produced by polymerizing in one reactor or produced in two or more reactors connected in series or parallel, followed by powder-blending. For example, the soft resin (A) can be produced by using one polymerization vessel, in which a propylene homopolymer or a propylene-α-olefin copolymer containing a small amount of α-olefin other than propylene is produced in a first step and a propylene-α-olefin copolymer is produced in a second step.

In this instance, instead of using the one polymerization vessel, a plurality of reactors may be connected in series, in which a propylene homopolymer or a propylene-α-olefin copolymer containing a small amount of α-olefin other than propylene is produced in the upstream side vessel and sent to the downstream side vessel, wherein a propylene-α-olefin copolymer is produced in the presence of the polymer produced in the upstream side vessel. Alternatively, it is possible to connect a plurality of polymerization vessels in parallel, in which case polymers produced in the vessels connected in parallel are introduced into a mixing vessel and blended (powder blend) to obtain a soft resin (A). The soft resin (A) can, of course, be produced by a single step polymerization using one polymerization vessel.

As the α-olefin for producing the soft resin (A), in addition to ethylene, various olefins such as 1-butene, 1-hexene, and 1-octene can be used. Ethylene is preferable due to easy availability, easy removal of unreacted monomers, and the like.

The soft resin of the component (A) in the resin composition of the invention may also be prepared by mixing and melt-kneading plurality of propylene-based resin pellets. In this instance, the above-described so called "reactor-made resins" are preferably used, because the resin components produced in each step are homogeneously mixed and can produce resin compositions and products with stable quality.

As specific examples of such a material, "Idemitsu TPO" manufactured by Idemitsu Kosan, Inc. (brand: R-110E, M-142E, T-310V, etc.), "Catalloy Adflex" manufactured by SunAllomer Ltd. (brand: Q200F), and the like can be given.

The homopolypropylene (B) has an MFR measured in accordance with JIS K 7210 at 230° C. and a load of 2.16 kg of 1 to 30 g/10 min., and preferably 4 to 15 g/10 min., and sill more preferably 5 to 15 g/10 min. If the MFR is less than 1 g/10 min., homogeneous blending with other resin components (components (A) and (C)) may be difficult. If homogeneous blending is attempted, various problems such as a great load imposed on the kneader, deterioration of the resin due to exothermic heat generation, an undue loss of mechanical characteristics, impaired external appearance, and surface stickiness may be caused.

If the MFR is more than 30 g/10 min., on the other hand, not only the strength (tension breaking strength) of the homopolypropylene itself is reduced, but also homogeneous blending with the soft resin (A) is difficult, giving rise to significantly impaired external appearance and mechanical characteristics.

The homopolypropylene (B) must have stereoregularity (mesopentad fraction rate) of 90% or more. If the stereoregularity (mesopentad fraction rate) is less than 90%, the crystal components in the component (B) for maintaining heat resistance is insufficient, resulting in a decrease in effect for preventing adhesion of resin to the roller in the plasticizing process during calendar molding and a decrease in heat resistant of a product. The mesopentad fraction rate is determined by $^{13}$C-NMR spectrum analysis which is described later.

The amount of the homopolypropylene (B) in the resin composition of the invention is from 2 to 10 mass %, and preferably from 4 to 10 mass %. If less than the above range, the amount of the crystal components in the resin composition is insufficient, giving rise to problems such as adhesion to the roller during calendar molding and a decrease in instant heat resistance of the product.

If more than the above range, on the other hand, the amount of the crystal components in the resin composition is too great, giving rise to difficulty in homogeneous plasticizing in the plasticizing process during calendar molding and impaired texture. More specifically, a hard and stiff feeling is produced, resulting in an impaired fitness feeling when the tape is reeled in.

The homopolypropylene (B) with high stereoregularity can be produced by a method known in the art.

As specific examples, "Idemitsu PP" manufactured by Idemitsu Petrochemical Co., Ltd. (brand: F-704NP, MFR=10, etc.) and the like can be given.

The propylene-ethylene random copolymer (C) has an ethylene content of 1 to 10 mass %, preferably 1 to 5 mass %, and still more preferably 2 to 5 mass %. If the ethylene content is less than 1 mass %, the amount of the component in the copolymer melted at a temperature lower than the melting point of the component (B) is too small, leading to plasticizing failure (unhomogeneous dissolution) during calendar molding. In addition, firm flexibility and texture provided by the copolymer is impaired.

If the ethylene content is more than 10 mass %, on the other hand, the amount of the component in the copolymer melted at a temperature lower than the melting point of the component (B) is too great, leading to improved plasticization during calendar molding. However, excessively decreased viscosity of the resin composition causes problems of the tape winding around a roller or the like in the plasticization step and in the later sheet-forming step, which not only significantly impairs productivity, but also leads to a shutdown of the process plant in the worst case.

The MFR of the copolymer (C) is preferably from 0.1 to 30 g/10 min., more preferably from 0.4 to 15 g/10 min., and still more preferably from 5 to 15 g/10 min. If the MFR is less than 0.1 g/10 min., homogeneous blending with other resin components (components (A) and (B)) may be difficult. If homogeneous blending is attempted, various problems such as a great load imposed on the kneader, deterioration of the resin due to exothermic heat generation, impaired external appearance, and surface stickiness may be caused.

If the MFR is more than 30 g/10 min., on the other hand, not only the strength of the copolymer (C) itself may be reduced, but also homogeneous blending with the soft resin (A) may be difficult, giving rise to possible significantly impaired external appearance and mechanical characteristics.

The amount of the copolymer (C) in the resin composition of the invention is from 2 to 20 mass %, preferably from 5 to 20 mass %, and still more preferably from 7 to 20 mass %. If less than the above range, the amount of low-melting point components in the resin composition is too small, giving rise to difficulty in homogeneous plasticizing in the plasticizing step during calendar molding, insufficient flexibility, and impaired texture. Specific problems include an impaired fitness feeling when the tape is reeled in.

If more than the above range, the amount of the low-melting point components in the resin composition is too great, giving rise to problems such as adhesion to the roller during calendar molding and a decrease in instant heat resistance of the product.

The copolymer (C) can be produced by a method known in the art.

As specific examples of such a material, "Idemitsu PP" manufactured by Idemitsu Petrochemical Co., Ltd. (brand: F-744NP, MFR=10, ethylene content=4.3 mass %, etc.), "Novatech" manufactured by Japan Polychem Corp. (brand: EG7FT, MFR=1.3, ethylene content=3.2 mass %), and the like can be given.

In the invention, although a resin composition capable of forming products such as a tape material with excellent texture can be obtained by homogeneously dispersing the above-mentioned components (A), (B), and (C) by melt kneading, the main component of the resin composition is the soft resin (A) which is inherently extendible. The inherently extendible properties are further promoted by uniform dispersion with other components. For this reason, the tape may not be cut well or a hand cut failure may occur in which tape cut sections are fibrillated, leading to an unacceptable finish. Almost no adhesive that has been preliminarily applied to the tape remains in such fibrillated tape cut sections. The tape may be peeled starting from those sections, leading to problems of slack wires and the like.

In such a case, a platy inorganic filler (D) may be further added to the resin composition of the invention. Specifically, the platy inorganic filler (D) is added, melted, and kneaded together with the above components (A), (B), and (C) to provide the tape with excellent hand-cutting properties, while maintaining the above-mentioned excellent characteristics.

The amount of platy inorganic filler (D) added is preferably from 1 to 15 mass %, and more preferably from 3 to 5 mass %, for 100 mass % of the total amount of the components (A), (B), (C), and (D). If added in an amount of more than 15 mass %, texture and adhesiveness of the product may be impaired, giving rise to possibility of poor finish of the product.

The average particle diameter (particle diameter of 50% cumulative distribution in a laser diffraction method) of the platy inorganic filler (D) is preferably 40 μm or less, and more preferably from 5 to 25 μm in view of excellent balance of performance and cost. The platy inorganic filler (D) having an average particle diameter of more than 40 μm has an increased probability of containing large particles with a diameter of more than 100 μm, which may make molding of product (e.g. calendar molding) difficult and impair the external appearance of the product.

As examples of the platy inorganic filler (D), mica, clay, kaolin, and talc can be given. Of these, talc is preferable from the viewpoint of the coloration and low cost.

As examples of specific materials, "UG" manufactured by Nippon Talc Co., Ltd., "TP-A25F" manufactured by Fuji Talc Industry, Ltd., and "FFR" manufactured by Asada Milling Co., Ltd. can be given.

When classified by temperature rising elution fractionation (TREF), the polypropylene-based resin composition containing the above components (A), (B), and (C) or the polypropylene-based resin composition containing the above components (A), (B), (C), and (D) of the invention preferably contains fractions eluted in a specific temperature range in a specific proportion. In this instance, the polypropylene-based resin composition to be subjected to TREF may contain the component (D), because the component (D) is removed by filtration before classification as described below.

The method of TREF employed in the invention comprises adding o-dichlorobenzene as a solvent to the resin composition, heating the mixture preferably to 130 to 140° C. to dissolve the resin components, filtering the mixture to remove insoluble components, adding a filler to the filtrate, cooling the mixture from 135° C. to 0° C. at a rate of 5° C./hr to crystallize the resin components, maintaining the mixture at 0° C. for 30 min., and heating the mixture at a rate of 40° C./hr, while fractionating dissolved components for each temperature range.

A series of procedures are preferably carried out in an inert gas atmosphere such as nitrogen in order to prevent deterioration of the sample. Since the filtration step is preferably carried out in a limited temperature range of 130 to 140° C., pressure filtration is preferably employed. A filter with a pore size of 5.0 μm made of Teflon (a registered trademark), for example, is preferably used.

The filler is usually used packed in a column. The sample solution after filtration is poured into a column packed with a carrier (filler). After that, the polymer is crystallized on the carrier by decreasing the temperature. Alternatively, it is possible to pack a container separate from the column with the filler and cause the polymer to crystallize in that container. In the invention, the sample solution is cooled from 135° C. to 0° C. at a rate of 5° C./hr.

As the filler, inert carriers such as sea sand, sellite, glass beads, and Chromosolve P can be used.

After cooling to 0° C., the sample is maintained at 0° C. for 30 min. to separate the liquid phase. Then, in the method of using a column, the temperature is increased at a rate of 40° C./hr, while circulating o-dichlorobenzene at a constant rate through the column to fractionate the fractions eluting at temperatures of more than 0° C. and not more than 100° C. After that, components eluted at temperatures above 100° C. are fractionated. In this instance, the concentration of the components eluted at different temperatures during heating is continuously measured using an infrared detector or the like. The amount of the sample eluted is plotted against the temperature to determine the amount of components eluted at temperatures of more than 0° C. and not more than 100° C. and the amount of components eluted at temperatures of above 100° C. When a column is not used, the amount of each component is determined by increasing the temperature and fractionating the components by solid-liquid separation at prescribed temperatures in the same manner as above.

In the polypropylene-based resin composition of the invention, the amount of components dissolved at temperature of 0° C., more than 0° C. and not more than 100° C., and above 100° C. are preferably 31 to 44 mass %, 43 to 55 mass %, and 13 to 16 mass %, respectively. If the amount of the components dissolved at 0° C. is less than 31 mass %, flexibility may be insufficient and the texture of the product may be impaired. If more than 45 mass %, on the other hand, a problem of adhesion to a roller may occur during calendar molding.

If the amount of the components fractionated at temperatures of more than 0° C. and not more than 100° C. is less than 43 mass %, homogeneous plasticizing may be inhibited and the texture of the product may be impaired. If more than 55 mass %, on the other hand, problems such as adhesion to a roller during calendar molding and insufficient instant heat resistance of the product may occur.

If the amount of the components fractionated at temperatures above 100° C. is less than 12 mass %, problems such as adhesion to a roller during calendar molding and insufficient instant heat resistance of the product may occur. If more than 16 mass %, on the other hand, problems such as difficulty in uniform plasticization in the plasticizing step during the calendar molding and impaired texture of the product may occur.

Additives such as an antioxidant, heat and aging resistant, lubricant, and metal deactivator (copper inhibitor), as well as a coloring agent and pigment, may optionally be added to the resin composition of the invention.

As the antioxidant, a phenolic antioxidant, sulfur-containing antioxidant, phosphorus-containing antioxidant, and the like can be used.

Examples of the phenolic antioxidant include 2,6-di-t-butyl-4-methylphenol, 2,6-di-t-butyl-4-ethylphenol, n-octadecyl-3-(3',5'-di-t-butyl-4'-hydroxyphenyl)propionate, tetrakis[methylene-3-(3,5-di-t-butyl-4-hydroxyphenyl)propionate]methane, tris(3,5-di-t-butyl-4-hydroxybenzyl)isocyanurate, 4,4'-butylidenebis(3-methyl-6-t-butylphenol), triethyleneglycol-bis[3-(3-t-butyl-4-hydroxy-5-methylphenyl)propionate], and 3,9-bis{2-[3-(3-t-butyl-4-hydroxy-5-methylphenyl)propionyloxy]-1,1-dimethylethyl}-2,4,8,10-tetraoxaspiro[5,5]undecane.

As the amount of the phenolic antioxidant(s) commonly used in a polypropylene-based resin composition, for example, from 0.05 to 0.5 part by weight per 100 parts by weight of the total of the components (A), (B), (C), and (D) may be used. If less than 0.05 part by weight, the effect of the antioxidant(s) may not be sufficient. An amount of more than 0.5 part by weight, on the other hand, may not bring about a performance proportionate to the cost increase.

As examples of the sulfur-containing antioxidant, dilauryl-3,3'-thiodipropionate, dimyristyl-3,3'-thiodipropionate, distearyl-3,3'-thiodipropionate, and pentaerythritoltetrakis(3-laurylthiopropionate) can be given.

An amount of the sulfur-containing antioxidant(s) commonly used in a polypropylene-based resin composition, for example, from 0.05 to 0.5 part by weight per 100 parts by weight of the total of the components (A), (B), (C), and (D) may be used. If less than 0.05 part by weight, the effect of the antioxidant(s) may not be sufficient. An amount of more than 0.5 part by weight, on the other hand, may not bring about a performance proportionate to the cost increase.

As examples of the phosphorus-containing antioxidant, trisnonylphenylphosphite, tris(2,4-di-t-butylphenyl)phosphite, distearylpentaerythritoldiphosphite, bis(2,4-di-t-butyl-4-methylphenyl)pentaerythritolphosphite, 2,2-methylenebis (4,6-di-t-butylphenyl)octylphosphite, and tetrakis(2,4-di-t-butylphenyl)-4,4'-biphenylene-di-phosphite can be given.

As the amount of the phosphorus-containing antioxidant(s) commonly used in a polypropylene-based resin composition, for example, from 0.05 to 0.5 part by weight per 100 parts by weight of the total of the components (A), (B), (C), and (D) may be used. If less than 0.05 part by weight, the effect of the antioxidant(s) may not be sufficient. An amount of more than 0.5 part by weight, on the other hand, may not bring about the performance proportionate to the cost increase.

In the resin composition of the invention, the use of 0.05 to 0.5 part by weight of (a) phenolic antioxidant(s) and 0.05 to 0.5 part by weight of a (a) sulfur-containing antioxidant(s) in combination is preferable in view of heat and aging resistance, particularly resistance against deterioration by heat when the product is exposed to high temperature conditions at 120 to 140° C. for a long period of time.

There are no specific limitations to the method of kneading and mixing. Various blenders, kneaders, mixers, and the like can be used.

The resin composition of the invention can be formed by various molding method such as calendar molding, extrusion molding (T-die molding), press molding, and injection molding. Calendar molding and extrusion molding (T-die molding) are particularly appropriate.

A film with a thickness of about 50 to 200 μm can be produced from the resin composition of the invention by calendar molding. As required, the film is cut into an appropriate width to produce a tape.

The film which is a molded product of the resin composition of the invention is free from a hard and stiff feeling, imparts excellent fitness feeling, and exhibits superior texture and external appearance with a small number of bumps and pinholes. The tape made from such a film exhibits excellent hand-cutting properties. The tape exhibits excellent texture, external appearance, and hand-cutting properties.

A molded product with adhesiveness (adhesive tape) can be produced by applying an adhesive to the tape of the invention or the raw material film. As the adhesive, known adhesives such as a rubber adhesive and acrylic adhesive can be used. Of these adhesives, an acrylic adhesive is preferable due to the excellent heat resistance. There are a solution-type (a solution polymerization-type), an aqueous emulsion-type (an emulsion polymerization-type), and the like of the acrylic adhesives. Although any types can be used, an aqueous emulsion-type acrylic adhesive is suitably used from the viewpoint of health and safety.

The emulsion polymer used for producing the aqueous emulsion-type acrylic adhesive which is suitably used in the invention is a (meth)acrylic acid-based polymer emulsion made from one or more types of alkyl(meth)acrylate as a main raw material monomer and (meth)acrylic acid as a comonomer. The thickness of the adhesive layer is usually from 5 to 300 μm. As a coating means, known coating instruments such as a bar coater and a knife coater can be used.

The molded product (adhesive tape) produced by applying an adhesive to the tape of the invention to provide adhesiveness, particularly the molded product (adhesive tape) produced by applying the aqueous emulsion-type acrylic adhesive to provide adhesiveness, can be used as a tape for wire harness which is used as an electric wiring system in vehicles, home electronics, business machines, and information machines and equipment, particularly as a wire harness tape for vehicles requiring heat resistance. The wire harness is generally produced by bundling a plurality of pieces of electric wires by wrapping one by one with a tape, for which the tape of the invention can be used.

EXAMPLES

The invention is described more specifically by way of examples. However, the following examples should not be construed as limiting the invention.

Measurements of properties of the resin components and resin compositions and evaluations of the resin compositions and molded products were carried out as follows.

(1) Melt Mass Flow Rate (MFR)

Measured according to JIS K 7210 (1999) at 230° C. under a load of 2.16 kg.

(2) ISO D Hardness

Measured according to JIS K7215 (1986).

(3) Xylene-Insoluble Part at Room Temperature and Xylene Soluble Part at Room Temperature The amounts of xylene soluble part and xylene-insoluble part of soft polypropylene at 25° C. were determined using the following method. 5±0.05 g of a sample was precisely weighed and put into a 1,000 ml eggplant flask. After the addition of 1±0.05 g of BHT (dibutylhydroxytoluene, a phenolic antioxidant), a rotor and 700±10 ml of p-xylene were put into the flask.

After mounting a condenser, the flask was heated over an oil bath of 140±5° C. while rotating the rotor for 120±30 min. to dissolve the sample in p-xylene.

The content in the flask was charged into a 1,000 ml beaker and left to cool to room temperature (25° C.) for 8 hours or more, while stirring with a stirrer. The precipitate was collected using a wire mesh. The filtrate was further filtered using filter paper and poured into a 3,000 ml beaker containing 2,000±100 ml of methanol and the mixture was allowed to stand at room temperature (25° C.) for 2 hours or more, while stirring with a stirrer.

The precipitate was collected using a wire mesh, dried in air for 5 hours or more, and dried in a vacuum drier at 100±5° C. for 240 to 270 min. to obtain xylene soluble part at 25° C.

The content (x) of the xylene soluble part at 25° C. is determined by the formula "x (mass %)=100×C/A" (wherein A is the weight (g) of the sample and C is the weight (g) of the collected xylene soluble part). The content of the xylene-insoluble part at 25° C. can be determined by the formula, "100-x (mass %)".

(4) Stereoregularity (Meso Pentad Fraction (mmmm))

The stereoregularity index of the homopolypropylene was determined as follows. In the $^{13}$C-NMR ($^{13}$C-nuclear magnetic resonance) spectrum of homopolypropylene, signals of methyl carbon are affected by stereoregularity and observed in nine split peaks ranging from a low magnetic field to a high magnetic field. They are mmmm, mmmr, rmmr, mmrr, mmrm+rrmr, rmrm, rrrr, mrrr, and mrrm. Of these nine peaks, six peaks with high peak intensity, i.e. mmmm, mmmr, mmrr, mmrm+rrmr, rrrr, and mrrm, were used for calculating the stereoregularity index of homopolypropylene according to the following formula.

Stereoregularity index (%)=$L_{mmmm}$×100/($L_{mmmm}$+$L_{mmmr}$+$L_{mmrr}$+$L_{mmrm+rrmr}$+$L_{rrrr}$+$L_{mrrm}$)

wherein $L_{mmmm}$, $L_{mmmr}$, $L_{mmrr}$, $L_{mmrm+rrmr}$, $L_{rrrr}$, and $L_{mrrm}$ are respectively the height of the peaks mmmm, mmmr, mmrr, mmrm+rrmr, rrrr, and mrrm from the base line in the $^{13}$C-NMR spectrum, provided that the peak of mmmm consists of a plurality of dispersed points, each having different chemical shift and intensity. These dispersed points occasionally differ from the original peak position (21.86 ppm). In such a case, two straight lines were drawn, each passing through two dispersed points, one on the lower magnetic field side of the original peak position and the other on the higher magnetic field side. The intersection of the two lines was regarded as the peak position. In addition, since the peak originating in mmmr was superposed on tailing of the main peak originating in mmmm, the height of these peaks from the base line was corrected according to the routine procedure.

(5) Ethylene Content

The ethylene content in the propylene-ethylene random copolymer was determined as follows. First, a triad chain fraction (mol %) of ethylene (E) and propylene (P) of a sample was calculated from seven peak intensities in the 35 to 21 ppm region (a tetramethylsilane (TMS) chemical shift standard) of $^{13}$C-NMR spectrum according to the following formula.

$f_{EPE}=[K(T\delta\delta)/T]\times 100$ $f_{PPE}=[K(T\beta\delta)/T]\times 100$ $f_{EEE}=[K(S\gamma\delta)/4T+K(S\delta\delta)/2T]\times 100$ $f_{PPP}=[K(T\beta\beta)/T]\times 100$ $f_{PEE}=[K(S\beta\delta)/T]\times 100$ $f_{PEP}=[K(S\beta\beta)/T]\times 100$ wherein $T=K(T\delta\delta)+K(T\beta\delta)+K(S\gamma\delta)/4+K(S\delta\delta)/2+K(T\beta\beta)+K(S\beta\delta)+K(S\beta\beta)$.

In the formula, $f_{EPE}$, for example, indicates an EPE triad chain fraction (mol %) and $K(T\delta\delta)$ indicates an integrated intensity of the peak originating from $T\delta\delta$ carbon.

Next, the ethylene content (mass %) was calculated using the triad chain fraction according to the following formula.

Ethylene content (mass %)=28{$3f_{EEE}$+2($f_{PEE}$+$f_{EPE}$)+$f_{PPE}$+$f_{PEP}$}×100/[28{$3f_{EEE}$+2($f_{PEE}$+$f_{EPE}$)+$f_{PPE}$+$f_{PEP}$}+42{$3f_{PPP}$+2($f_{PPE}$+$f_{PEP}$)+$f_{EPE}$+$f_{PEE}$}]

(6) Measurement of the Amount of Elution Components by Temperature Rise Elution Fractionating (TREF) Method 10 g of o-dichlorobenzene was added to 60 mg of a sample at room temperature. The mixture was heated in an aluminum block heater with a magnetic stirrer set at 150° C. for 60 min. while stirred to dissolve the sample. Separately, a pressure filter apparatus made of stainless steel, in which a filter (made of Teflon (registered trademark), pore size: 5.0 μm) was set, was provided. After adjusting the internal temperature of the pressure filter apparatus at 130 to 140° C., the entire amount of the dissolved sample solution was added, immediately followed by filtration while applying pressure with nitrogen. The filtrate was maintained at 135° C.

A stainless steel column with an internal diameter of 4.2 mm and a length of 150 mm, packed with Chromosolve P (30/60), was used as a TREF column. 0.5 ml of the above filtrate was added to the column at 135° C. and gradually cooled to 0° C. at a rate of 5° C./hr to cause the polymer to crystallize on the surface of the filler. Then, the column was maintained at 0° C. for 30 min. The amount of the polymer remaining without being crystallized was regarded as the components dissolved at 0° C.

Next, the column temperature was raised from 0° C. to 135° C. at a rate of 40° C./hr, while circulating o-dichlorobenzene at a rate of 1.0 ml/min in the column. The concentration of eluted polymer was continuously measured using an infrared detector, equipped with a flow cell for temperature increase, at a wavelength of 3.41 μm. The amount of the sample eluted was plotted against the temperature to determine the amount of components eluted at temperatures of from 0° C. (exclusive) to 100° C. (inclusive) and the amount of components eluted at temperatures of above 100° C.

(7) Calendar Moldability

<Adhesion to Roller>

Resin compositions which did not adhere to the roller during calendar molding were evaluated as "Good", those adhering to part of the roller were evaluated as "Bad", and those adhering to the entire roller were evaluated as "Very Bad".

<Homogeneous Plasticization>

A calendar-formed film which is not homogeneously plasticized has an uneven thickness and bumps. The external appearance of 20 cm×20 cm films with a thickness of 70 μm obtained by calendar molding was observed by eye and the results were evaluated as follows.

Good: Number of bumps with a diameter of 0.5 mm or more is one or less and thickness unevenness is not more than ±10 μm.

Fair: Number of bumps with a diameter of 0.5 mm or more is two to four and thickness unevenness is not more than ±10 μm.

Bad: Number of bumps with a diameter of 0.5 mm or more is five or more and thickness unevenness is ±10 μm or more.

(8) Characteristics of Tape

<Texture>

A film with a thickness of 70 μm obtained by calendar molding was crumpled to observe the presence or absence of folding lines produced by the naked eye and rolled on a finger to evaluate fitness feeling (tactile sensation).

Good: Tapes having no folding lines and, when rolled on the finger with pressing, imparting an excellent fitness feeling without loosening.

Fair: Tapes having folding lines or, when rolled on the finger, imparting no excellent fitness feeling or being loosened.

Bad: Tapes having folding lines and, when rolled on the finger, imparting no excellent fitness feeling and being loosened.

<Hand Cutting Properties>

A tape, of which one of the ends was secured, was instantaneously cut by drawing and twisting the tape body. Whitening, drawing conditions, and fibrillation were visually evaluated.

Good: The width of whitened fibrillated cut section was less than 5 mm.
Fair: The width of whitened fibrillated cut section was less than 10 mm.
Bad: The width of whitened fibrillated cut section was 10 mm or more.

<External Appearance of Tape>

Presence or absence of bumps and pinholes (small holes) in the obtained tape was evaluated by visually counting the total number of bumps and holes with a diameter of 0.5 mm or more per 20 cm×20 cm film.

The results are rated according to the number of bumps and holes as follows:
Good: one or less
Fair: one to three
Bad: more than 3

(9) Initial Properties of Tape

<Instantaneous Heat Resistance>

Both ends of the obtained tape were secured on a U-shaped jig with a height of 15 mm and a width of 25 mm made of aluminum (see FIG. 1(a)), placed in a thermostat-equipped oven at 140 to 160° C. for 30 min., and left to cool at 23° C. and 50% RH. After cooling, the degree of twisting of the sample, in terms of 100×Wt/Wo (%) wherein Wo indicates the initial width and Wt indicates the shortest width after test (see FIG. 1(b)), was evaluated as follows.

Excellent: 85% or more
Good: 70% or more
Fair: 55 to 70%
Bad: 40 to 55%
Very Bad: 40% or less Example 1

<Preparation of Resin Composition>

80 wt % of soft polypropylene ("Idemitsu TPO: R110E" manufactured by Idemitsu Petrochemical Co., Ltd.), 7.5 wt % of homopolypropylene ("Idemitsu PP: F-704NP" manufactured by Idemitsu Petrochemical Co., Ltd.), 7.5 wt % of propylene-ethylene random copolymer ("Idemitsu PP: F-744NP" manufactured by Idemitsu Petrochemical Co., Ltd.), and 5 wt % of talc ("UG agent" manufactured by Nippon Talc Co., Ltd.) were weighed. For 100 parts by weight of the total of these components, 0.2 part by weight of antioxidant "Ing 1010" (manufactured by Ciba Specialty Chemicals Co.), 0.2 part by weight of "DMTP" (manufactured by API Corp.), and 0.1 part by weight of "Ingf 168" (manufactured by Ciba Specialty Chemicals Co.) were weighed. All of the weighed components were blended for two min. in a mixer ("Super-Floater: SFC-50" manufactured by KAWATA MFG Co. Ltd.).

The blended material was then kneaded using a unidirectional rotating twin screw extruder ("TEX-30α" manufactured by The Japan Steel Works, Ltd.), cooled in a cooler, and pelletized using a pelletizer. The resulting pellets were dried in a hot-air dryer at 80° C. for two days to obtain a resin composition. The twin screw extruder was operated at a screw rotation of 300 rpm, at a constant temperature of 200° C., and an injection amount of 70 kg/H.

<Film Formation>

The resin composition obtained was formed into a film with a thickness of 70 μm by calendar molding. Specifically, the sample was plasticized in a pressure kneader (set at 170° C.) and the plasticized sample was formed into a film with a thickness of 70 μm at a calendar temperature of 180° C., a take-off roll temperature of 170° C., and an emboss roll temperature of 20° C.

<Preparation of Tape>

A glue was attached to the film produced by calendar molding using a sizing machine and cut into a tape with a width of 19 mm. Glue ("SC-2" manufactured by Musashino Chemical Co., Ltd.) was applied to a dry thickness of 20 μm using a glue coater and dried at 100° C. for 3 min.

Formulations of the resin compositions prepared in Example 1 and later-described Examples 2 to 5 and Comparative Examples 1 to 6 are shown in Table 1, analytical results of the resin used for the resin compositions are shown in Table 2, and the evaluation results of the resin composition and the molded products are shown in Table 3.

TABLE 1

| | | | Example | | | | | Comparative Example | | | | | |
|---|---|---|---|---|---|---|---|---|---|---|---|---|---|
| | Type | Trade name | 1 | 2 | 3 | 4 | 5 | 1 | 2 | 3 | 4 | 5 | 6 |
| Resin component (wt %) | Soft polypropylene | Idemitsu TPO R-110E | 80 | 80 | | | | 65 | | | | | |
| | | Idemitsu TPO M-142E | | | 80 | | | | | | | | |
| | | Idemitsu TPO T-310V | | | | 70 | | | | | | | |
| | | Catalloy (Adflex) Q200F | | | | | 85 | | | | | 85 | 90 |
| | Ethylene-based resin | Everflex EEA A-714 | | | | | | | 80 | | | | |
| | | Catalloy (Adflex) Q100F | | | | | | | | 70 | | | |
| | | Engage EG8842 | | | | | | | | | 70 | | |
| | Homopolypropylene | Idemitsu PP F-704NP | 7.5 | 7.5 | 4 | 7 | 5 | 5 | 7.5 | 5 | 18 | | |
| | Propylene-ethylene random copolymer | Idemitsu PP F-744NP | 7.5 | 7.5 | 11 | 18 | 10 | 25 | 7.5 | 20 | 7 | | |
| | Propylene-ethylene block copolymer | Idemitsu PP J-783HV | | | | | | | | | | 15 | |

TABLE 1-continued

|  | Type | Trade name | Example 1 | 2 | 3 | 4 | 5 | Comparative Example 1 | 2 | 3 | 4 | 5 | 6 |
|---|---|---|---|---|---|---|---|---|---|---|---|---|---|
| Platy inorganic filler (wt %) | Talc | UG agent | 5 |  | 5 | 5 |  | 5 |  | 5 | 5 |  |  |
|  |  | FFR |  | 5 |  |  |  |  | 5 |  |  |  | 10 |
| Additive (part by weight*) | Phenolic antioxidant | Irg 1010 | 0.2 |  |  | 0.2 | 0.2 | 0.2 | 0.2 | 0.2 | 0.2 | 0.2 | 0.2 |
|  |  | Irg 1076 |  | 0.5 |  |  |  |  | 0.5 |  |  |  |  |
|  |  | Irg 3114 |  |  | 0.2 |  |  |  |  |  |  |  |  |
|  | Sulfur-containing antioxidant | DMTP | 0.2 | 0.2 | 0.2 | 0.2 | 0.2 | 0.2 |  | 0.2 | 0.2 | 0.2 | 0.2 |
|  | Phosphorus-containing antioxidant | Ingf 168 | 0.1 |  | 0.1 | 0.1 | 0.1 | 0.1 | 0.1 | 0.1 | 0.1 | 0.1 | 0.1 |

*For 100 parts by weight of the total amount of the resin components and platy inorganic filler.

Soft Polypropylene:
Idemitsu TPO R110E, manufactured by Idemitsu Kosan Co., Ltd., MFR=1.5 g/10 min.
Idemitsu TPO M-142E, manufactured by Idemitsu Kosan Co., Ltd., MFR=10 g/10 min.
Idemitsu TPO T-310V, manufactured by Idemitsu Kosan Co., Ltd., MFR=1.5 g/10 min.
Catalloy (Adflex) Q200F, manufactured by SunAllomer Ltd., MFR=0.8 g/10 min.

Ethylene-Based Resin:
Everflex EEA A-714, manufactured by Du Pont-Mitsui Polychemicals Co., Ltd.
Catalloy (Adflex) Q100F, manufactured by SunAllomer Ltd., MFR=0.5 g/10 min.
Engage EG8842, manufactured by DuPont Dow Elastmers Co., Ltd.

Homopolypropylene:
Idemitsu PP F-704NP, manufactured by Idemitsu Kosan Co., Ltd., MFR=10 g/10 min.

Propylene-Ethylene Random Copolymer:
Idemitsu PP F-744NP, manufactured by Idemitsu Kosan Co., Ltd., MFR=10 g/10 min., ethylene content: 4.3 mass %

Propylene-Ethylene Block Copolymer:
Idemitsu PP J-783HV, manufactured by Idemitsu Kosan Co., Ltd.

Talc:
UG agent (average particle diameter: 20 μm) manufactured by Nippon Talc Co., Ltd.
FFR (average particle diameter: 4 μm) manufactured by Asada Milling Co., Ltd.

Phenolic Antioxidant:
Ing 1010, manufactured by Ciba Specialty Chemicals Co., Ltd.
Ing 1076, manufactured by Ciba Specialty Chemicals Co., Ltd.
Ing 3114, manufactured by Ciba Specialty Chemicals Co., Ltd.

Sulfur-Containing Antioxidant:
DMTP, manufactured by API Corp.

Phosphorus-Containing Antioxidant:
Ingf 168, manufactured by Ciba Specialty Chemicals, Inc.
The average particle diameter of talc is the particle diameter of a 50% cumulative distribution determined by a laser diffraction method.

TABLE 2

|  |  | Example 1 | 2 | 3 | 4 | 5 | Comparative Example 1 | 2 | 3 | 4 | 5 | 6 |
|---|---|---|---|---|---|---|---|---|---|---|---|---|
| Soft polypropylene or ethylene-based resin | ISO D hardness | 20 | 20 | 20 | 34 | 30 | 20 | — | 37 | — | 30 | 30 |
|  | Xylene-insoluble part (mass %) | 29.7 | 29.7 | 28.5 | 41 | 49.5 | 29.7 | — | 59.8 | — | 49.5 | 49.5 |
|  | Xylene-soluble part (mass %) | 70.3 | 70.3 | 71.5 | 59 | 50.5 | 70.3 | — | 40.2 | — | 50.5 | 50.5 |
| Homopolypropylene | MFR (g/10 min.) | 10 | 10 | 10 | 10 | 10 | 10 | 10 | 10 | 10 | — | — |
|  | mmmm (%) | 90.8 | 90.8 | 90.8 | 90.8 | 90.8 | 90.8 | 90.8 | 90.8 | 90.8 | — | — |
| Propylene-ethylene random copolymer | Ethylene content (mass %) | 4.3 | 4.3 | 4.3 | 4.3 | 4.3 | 4.3 | 4.3 | 4.3 | 4.3 | — | — |

TABLE 3

|  |  |  | Example 1 | 2 | 3 | 4 | 5 | Comparative Example 1 | 2 | 3 | 4 | 5 | 6 |
|---|---|---|---|---|---|---|---|---|---|---|---|---|---|
| Resin composition | MFR | (g/10 min.) | 2 | 2 | 9.5 | 2.4 | 0.7 | 2.5 | 108 | 105 | 2.9 | 0.7 | 0.5 |
|  | Analytical results by TREF | 0° C.: (mass %) | 38.3 | 38.3 | 39.1 | 31.3 | 40.3 | 31.6 | 45 | 26.5 | 36 | 40.7 | 47 |
|  |  | More than 0° C. but not more than 100° C.: (mass %) | 48.2 | 48.2 | 47.3 | 54.4 | 43.9 | 56.3 | 42.6 | 61 | 46.1 | 35.7 | 40.9 |

TABLE 3-continued

|  |  |  | Example | | | | | Comparative Example | | | | | |
| --- | --- | --- | --- | --- | --- | --- | --- | --- | --- | --- | --- | --- | --- |
|  |  |  | 1 | 2 | 3 | 4 | 5 | 1 | 2 | 3 | 4 | 5 | 6 |
|  |  | More than 100° C.: (mass %) | 13.5 | 13.5 | 13.6 | 14.4 | 15.8 | 12.1 | 12.5 | 12.5 | 18 | 23.6 | 12.1 |
|  | Calendar moldability | Homogeneous plasticization | G | G | G | G | G | G | B | G | B | B | G |
|  |  | Adhesion to roller | G | G | G | G | G | B | B | B | G | G | VB |
| Molded product | Characteristics of tape | Texture | G | G | G | G | G | F | G | B | B | B | G |
|  |  | Hand-cutting properties | G | G | G | G | G | G | F | G | G | F | B |
|  |  | External appearance of tape | G | G | G | G | G | G | G | G | B | F | G |
|  | Initial properties of tape | Instantaneous heat resistance 160° C., 30 min. | F | F | F | F | F | B | VB | F | B | B | F |
|  |  | 150° C., 30 min. | G | G | G | G | F | F | VB | G | B | F | G |
|  |  | 140° C., 30 min. | E | E | E | E | E | G | B | E | F | G | E |

E = Excellent,
G = Good,
F = Fair,
B = Bad,
VB = Very Bad

Examples 2 to 5 and Comparative Examples 1 to 6

Resin compositions were prepared, formed, and evaluated in the same manner as in Example 1 except that the resin components, platy inorganic fillers, and additives shown in Table 1 for each Example and Comparative Example were used.

The results are shown in Tables 2 and 3.

INDUSTRIAL APPLICABILITY

The molded products produced by forming the resin composition of the invention is suitable as a tape for vehicle mounting, sheet material, part, industrial tape, and the like. The molded product produced by calendar molding the resin composition of the invention is particularly suitable as a tape material (adhesive tape) for vehicle wire harnesses.

What is claimed is:

1. A polypropylene-based resin composition consisting essentially of the following components (A) to (D):
   (A) 70 to 96 mass % of a polypropylene-based soft resin having an ISO D hardness of 35 or less and a melt mass flow rate (MFR) at 230° C. with a load of 2.16 kg measured in accordance with JIS K 7210 of 0.1 to 20 g/10 min, and containing 25 to 55 mass % of xylene-insoluble part at room temperature and 75 to 45 mass % of xylene-soluble part at room temperature,
   (B) 2 to 10 mass % of homopolypropylene having a melt mass flow rate (MFR) at 230° C. under a load of 2.16 kg measured in accordance with JIS K 7210 of 1 to 30 g/10 min. and stereoregularity (meso pentad fraction) of 90% or more,
   (C) 2 to 20 mass % of a propylene-ethylene random copolymer having an ethylene content of 1 to 10 mass %, and
   (D) 0 to 15 mass % of a platy inorganic filler.

2. The polypropylene-based resin composition according to claim 1, which comprises 31 to 44 mass % of components soluble at 0° C., 43 to 55 mass % of components fractionated at temperatures of more than 0° C. and not more than 100° C., and 13 to 16 mass % of components fractionated at temperatures of more than 100° C., when fractionated by temperature rising elution fractionation (TREF), wherein TREF comprises adding o-dichlorobenzene to the polypropylene-based resin composition, heating the mixture to dissolve the resin components, filtering the mixture, adding a filler to the filtrate, cooling the mixture from 135° C. to 0° C. at a rate of 5° C./hr to crystallize the resin, maintaining the mixture at 0° C. for 30 min., and heating the mixture at a rate of 40° C./hr.

3. The polypropylene-based resin composition according to claim 1, comprising the component (D) in an amount of 1 to 15 mass %.

4. The polypropylene-based resin composition according to claim 1, wherein the polypropylene-based soft resin of the component (A) is produced by polymerizing in one reactor or produced in two or more reactors connected in series or parallel, followed by powder-blending.

5. The polypropylene-based resin composition according to claim 1, wherein the platy inorganic filler of the component (D) is talc.

6. The polypropylene-based resin composition according to claim 1, further comprising 0.05 to 0.5 part by weight of (a) phenolic antioxidant(s) and 0.05 to 0.5 part by weight of (a) sulfur-containing antioxidant(s) for 100 parts by weight of the total amount of the components (A) to (D).

7. A molded product made from the polypropylene-based resin composition according to claim 1 by a calendar molding method.

8. The molded product according to claim 7, wherein the product is a tape.

9. The molded product according to claim 8, wherein the tape has an aqueous emulsion-type acrylic adhesive coated thereon.

10. The molded product according to claim 8, wherein the product is a tape for vehicle wire harnesses.

11. The polypropylene-based resin composition according to claim 1, wherein the polypropylene-based soft resin has a melt mass flow rate (MFR) at 230° C. with a load of 2.16 kg measured in accordance with JIS K 7210 of 0.4 to 10 g/10 min.

12. A tape made by a calendar molding method from a polypropylene-based resin composition comprising the following components (A) to (D):

(A) 70 to 96 mass % of a polypropylene-based soft resin having an ISO D hardness of 35 or less and a melt mass flow rate (MFR) at 230° C. with a load of 2.16 kg measured in accordance with JIS K 7210 of 0.1 to 20 g/10 min, and containing 25 to 55 mass % of xylene-insoluble part at room temperature and 75 to 45 mass % of xylene-soluble part at room temperature, (B) 2 to 10 mass % of homopolypropylene having a melt mass flow rate (MFR) at 230° C. under a load of 2.16 kg measured in accordance with JIS K 7210 of 1 to 30 g/10 min, and stereoregularity (meso pentad fraction) of 90% or more, (C) 2 to 20 mass % of a propylene-ethylene random copolymer having an ethylene content of 1 to 10 mass %, and (D) 0 to 15 mass % of a platy inorganic filler.

13. The tape according to claim 12, wherein the polypropylene-based soft resin has a melt mass flow rate (MFR) at 230° C. with a load of 2.16 kg measured in accordance with JIS K 7210 of 0.4 to 10 g/10 min.

14. The tape according to claim 12, wherein the polypropylene-based resin composition comprises 31 to 44 mass % of components soluble at 0° C., 43 to 55 mass % of components fractionated at temperatures of more than 0° C. and not more than 100° C., and 13 to 16 mass % of components fractionated at temperatures of more than 100° C., when fractionated by temperature rising elution fractionation (TREF), wherein TREF comprises adding o-dichlorobenzene to the polypropylene-based resin composition, heating the mixture to dissolve the resin components, filtering the mixture, adding a filler to the filtrate, cooling the mixture from 135° C. to 0° C. at a rate of 5° C./hr to crystallize the resin, maintaining the mixture at 0° C. for 30 min., and heating the mixture at a rate of 40° C./hr.

15. The tape according to claim 12, wherein the polypropylene-based resin composition comprises the component (D) in an amount of 1 to 15 mass %.

16. The tape according to claim 12, wherein in the polypropylene-based resin composition the platy inorganic filler of the component (D) is talc.

17. The tape according to claim 12, wherein the polypropylene-based resin composition further comprises 0.05 to 0.5 part by weight of (a) phenolic antioxidant(s) and 0.05 to 0.5 part by weight of (a) sulfur-containing antioxidant(s) for 100 parts by weight of the total amount of the components (A) to (D).

18. The polypropylene-based resin composition according to claim 1, consisting of the following components (A) to (D):

(A) 70 to 96 mass % of a polypropylene-based soft resin having an ISO D hardness of 35 or less and a melt mass flow rate (MFR) at 230° C. with a load of 2.16 kg measured in accordance with JIS K 7210 of 0.1 to 20 g/10 min, and containing 25 to 55 mass % of xylene-insoluble part at room temperature and 75 to 45 mass % of xylene-soluble part at room temperature, (B) 2 to 10 mass % of homopolypropylene having a melt mass flow rate (MFR) at 230° C. under a load of 2.16 kg measured in accordance with JIS K7210 of 1 to 30 g/10 min. and stereoregularity (meso pentad fraction) of 90% or more, (C) 2 to 20 mass % of a propylene-ethylene random copolymer having an ethylene content of 1 to 10 mass %, and (D) 0 to 15 mass % of a platy inorganic filler.

19. The polypropylene-based resin composition according to claim 18, wherein the polypropylene-based soft resin has a melt mass flow rate (MER) at 230° C. with a load of 2.16 kg measured in accordance with JIS K 7210 of 0.4 to 10 g/10 min.

* * * * *

UNITED STATES PATENT AND TRADEMARK OFFICE
CERTIFICATE OF CORRECTION

PATENT NO.       : 7,598,309 B2
APPLICATION NO.  : 11/364556
DATED            : October 6, 2009
INVENTOR(S)      : Sugita et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 821 days.

Signed and Sealed this

Twenty-eighth Day of September, 2010

David J. Kappos
*Director of the United States Patent and Trademark Office*